Sept. 22, 1942.    A. WOLF ET AL    2,296,754
ASTATIC ELECTROMAGNETIC VIBRATION DETECTOR
Filed April 29, 1939

ALEXANDER WOLF
LAURENCE G. COWLES
INVENTORS

THEIR ATTORNEYS

Patented Sept. 22, 1942

2,296,754

UNITED STATES PATENT OFFICE 2,296,754

ASTATIC ELECTROMAGNETIC VIBRATION DETECTOR

Alexander Wolf and Laurence G. Cowles, Houston, Tex., assignors, by mesne assignments, to The Texas Company, New York, N. Y., a corporation of Delaware Application April 29, 1939, Serial No. 270,726

1 Claim. (Cl. 177—352)

This invention relates to seismic vibration detectors and more particularly to the provision of such an instrument or system of instruments which are insensitive to external alternating magnetic fields.

In the exploration for minerals by the seismic method it is a common practice to employ electro-magnetic vibration detectors, which may be constructed in a variety of ways. A common feature, however, of all such instruments is that they contain a coil of wire, which may be wound directly on an iron core, or may be mounted movably around an iron core. An iron core may also be mounted movably inside the coil. All such detectors also contain a permanent magnet, or an electromagnet. The purpose of the detectors is to convert minute ground motions into electric currents or voltages, which are usually amplified by means of vacuum tube amplifiers and recorded by means of electric oscillographs.

Since the motions of the ground which must be observed are very small, frequently one-millionth part of an inch, or less, the voltages and currents developed by the detectors are very small. When it is attempted to make observations in the vicinity of electric power-lines, it is frequently found that the alternating magnetic field surrounding the power-line induces a much higher voltage in the detector than the voltages produced by the ground motion. Under these conditions, it is obviously impossible to observe the latter. Attempts have been made in the past to obviate this difficulty by placing a magnetic shield around the detector, which consists as a rule of one or more iron shells. Such a shield necessarily increases greatly the size and weight of the detector, which is a serious disadvantage, since the instruments must be portable.

It is the purpose of the present invention to provide simple means whereby an electromagnetic detector or system of detectors may be rendered insensitive to external alternating magnetic fields, such as surround electric power-lines. Such a system is termed "astatic," by analogy with the nomenclature of standard electrical measuring instruments.

Figure 1:
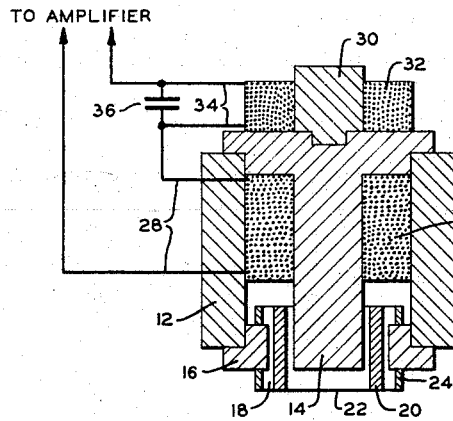
Figure 2:
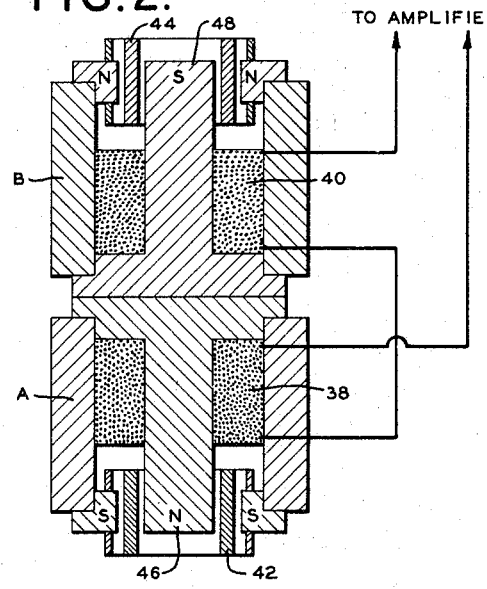
Figure 3:
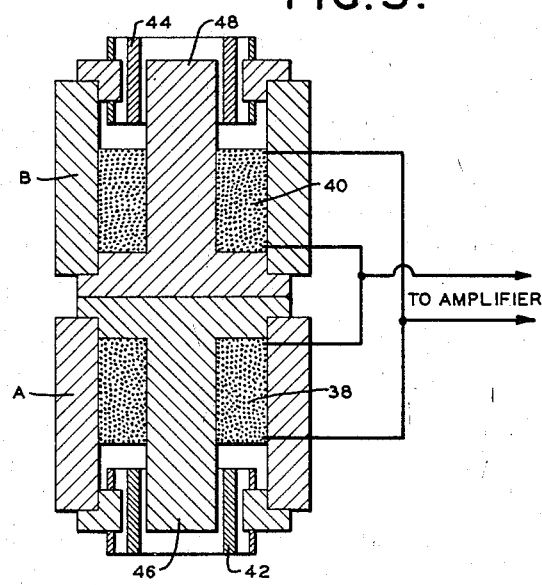
Figure 4:
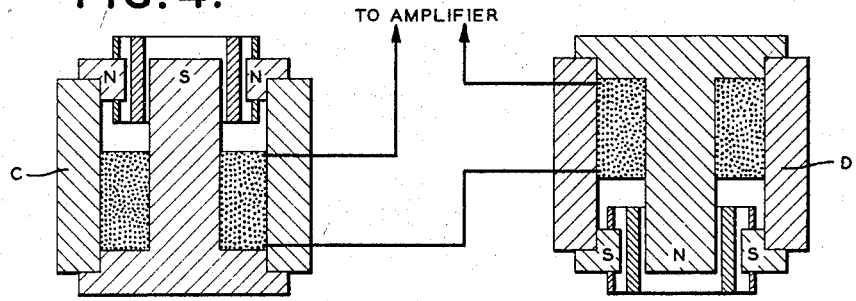

Three forms of the invention are illustrated in the attached drawing in which:

Figure 1 is a sectional elevation of a detector provided with a compensating system, Figures 2 and 3 are sectional elevations of a dual detector, in which the two elements of each compensate each other, Figure 4 represents a system of two separate detectors which compensate each other.

With reference to the drawing, Figure 1 represents an electromagnetic detector, of the form described in U. S. Letters Patent No. 2,130,213, issued to Alexander Wolf et al. Such a detector comprises essentially a magnet, shown in this case as a permanent magnet 10 having poles 12 and 14 and a pole piece 16. The outer pole 12 may be cylindrical and concentric with the inner pole 14. The pole piece 16 may be annular and is attached to the outer pole 12 so as to leave an air gap 18. Resiliently mounted within the air gap 18 is an induction ring 20. The ring 20 may be supported or suspended between a pair of flexible diaphragms 22 attached to a supporting ring 24 mounted on the pole piece 16. A pick-up coil 26 is shown as disposed between the poles 12 and 14. The magnet 10 is preferably mounted in a suitable container or housing, not shown, and is adapted to be moved or vibrated with the earth in which it is mounted. Due to its inertia, the ring 20 tends to remain stationary and the resulting relative movement between the magnet and the ring causes an electrical current to be thereby generated in the coil 26 which current is passed through leads 28 to a suitable amplifier, not shown, as is well known in the art.

In accordance with the invention, a short iron cylinder or core 30 is secured to the magnet 10 and this core is surrounded by a coil of insulated wire 32. The coil 32 may be referred to hereinafter as a "compensating" coil. Any external magnetic field results in magnetic flux lines through cores 30 and 14. The ratio of the flux through core 30 to that through core 14 is independent of the field strength, and hence it is possible to adjust the number of turns on coil 32 in such a way that the voltage induced in coil 32 equals exactly the voltage in coil 26. The two coils are then connected in series by leads 28 and 34 in such a way that the two voltages induced by the external field cancel each other. In actual practice there may also be a small difference in phase between the voltages in the two coils 26 and 32. In this case it may be necessary as a final adjustment to connect a small condenser 36 across coil 32, as shown in Figure 1, or possibly across coil 26, depending on the relative phases of the two voltages. It is clear that, whereas the voltages induced by external fields in coils 26 and 32 cancel each other, the voltage produced in coil 26 by the motion of the ground still appears across the wires leading to the amplifier, because no corresponding voltage is induced in coil 32. This is the case because the flux of magnet 10 does not link coil 32.

The polarity of the voltage appearing across the main coil of the detector can be reversed by doing the following: (1) turning the detector upside down, since this reverses the motion of the suspended element, (2) reversing the polarity of the magnet, or (3) reversing the direction in which the pick-up coil is wound. The polarity produced by external fields is also reversed by (1) and (3) above, but not by (2). Thus, whenever the polarity of the magnet is reversed, and in addition either the detector is reversed in space, or the direction in which the coil is wound is reversed, the net result is the reversal of the polarity of voltage produced by the external field, but not the reversal of polarity produced by ground motion. Figures 2 and 4 which will be described are merely illustrations of this principle.

Another method of eliminating the effect of external magnetic fields is shown in Figure 2, where A and B are two identical vibration detectors of the same form as in Figure 1, placed end to end in the same housing, not shown. Pick-up coils 38 and 40 are connected in series, as shown in Figure 2. It is obvious that the magnetic flux due to an external field and linking coil 38 is identical with that linking coil 40, and since the coils are reversed in space relative to each other, the sum of the voltages induced in them is exactly zero. Any motion of the ground will cause the two induction rings 42 and 44 to move exactly together, either up or down, so that when ring 42 moves into detector A, ring 44 moves out of detector B. The two detectors are polarized in opposite directions. For instance, in detector A the center pole 46 may be polarized "North," while in detector B the center pole 48 may be polarized "South." As a result, the motion of ring 42 into detector A, and the motion of ring 44 out of detector B, produce voltages of identical polarity in coils 38 and 40, respectively. Thus, the net voltage due to ground motion of the entire combination will be double that of a single detector, while at the same time the net voltage induced by an external magnetic field will be zero.

It will be clear to those skilled in the art that the same effect can be achieved by connecting the coils of the two detectors A and B in parallel, as shown schematically in Figure 3, since the voltages induced by external magnetic fields are then effectively short-circuited, while the voltage of the combination due to ground motion is then equal to that of only one detector.

A third form of the invention is shown in Figure 4, which differs essentially from Figure 2 only by the fact that the two detectors C and D, forming the combination, are now placed in separate cases, not shown in the figure. Detectors C and D may be placed side by side, or D on top of C, but under ordinary conditions it is found that the magnetic field of a power-line is sufficiently uniform so that one can obtain the desired compensation even with the detectors C and D some distance apart. This makes it possible to observe the sum of the ground motions occurring simultaneously at two points some distance apart, while at the same time eliminating the interference from power-lines, and without increasing the number of the elements beyond that required for the scheme illustrated in Figures 2 and 3. The advantages of observing the sum of the simultaneous ground motions at two separate points are well known to those engaged in exploration by the seismic method, and are also outlined in U. S. Letters Patent No. 1,799,398, granted to Henry Gordon Taylor.

The methods outlined above are merely illustrations of the general principles involved and many modifications will occur to those skilled in the art. It is also clear that, while reference was made to one particular type of electro-magnetic vibration detector, the methods are equally applicable to any vibration detector comprising essentially a coil of wire and a permanent, or electromagnet.

While a preferred method of, and suitable apparatus for, carrying out the method has been described, it will be understood that changes may be made in the procedure to be followed without departing from the spirit of the invention. It is desired only to be limited in this respect by the scope of the claim which follows.

We claim:

An electromagnetic earth vibration system comprising two similar detector units, each of said units including a magnet having an outer pole and an inner pole, a pick-up coil wound around the inner pole of each magnet and an annular inertia member resiliently suspended between the poles of each magnet, each of said coils having the same number of turns and the magnetic field being of equal magnitude and of the same direction in the two coils, said detector units being arranged in a parallel relation in a vertical plane and separated in the direction in which direct waves are received by a distance such that voltages induced in the coils by the direct waves will be opposite in phase, the polarity of the inner pole of the magnet of one unit being the opposite of the polarity of the inner pole of the magnet of the other unit, the pick-up coils of said unit being connected electrically in series so that the resulting output of said pick-up coils due to earth vibrations is equal to the algebraic sum of the voltages of each of said coils, while the voltages induced in said coils by an external magnetic field are canceled.

ALEXANDER WOLF.
LAURENCE G. COWLES.